United States Patent [19]

Kraynak et al.

[11] Patent Number: 5,743,099
[45] Date of Patent: Apr. 28, 1998

[54] ENERGY SAVING HVAC CONTROL SYSTEM

[76] Inventors: Francis Kraynak, R.D. #4, Box 162; Robert Kraynak, 38 McCormick Ave., both of Uniontown, Pa. 15401

[21] Appl. No.: 661,744

[22] Filed: Jun. 11, 1996

[51] Int. Cl.[6] .................................................. F25D 21/00
[52] U.S. Cl. ................... 62/150; 62/161; 62/180; 165/204
[58] Field of Search ............... 62/155, 156, 151, 62/193, 234, 244, 180, 182, 176.1, 176.2, 176.3, 161, 163, 150; 165/204, 231, 232, 233

[56] References Cited

U.S. PATENT DOCUMENTS

| 4,448,034 | 5/1984 | Shimada et al. | 62/161 |
| 4,783,970 | 11/1988 | Takahashi | 62/176.3 |
| 4,895,000 | 1/1990 | Takahashi | 62/180 X |
| 4,910,967 | 3/1990 | Takahashi | 165/233 X |

OTHER PUBLICATIONS

The 1996 Oldsmobile Ciera SL Owner's Manual, First Edition, Copyright General Motors Corporation 1995, pp. i–ii and 3.2.

Controls and Features, Copyright 1996 Ford Motor Company, p. 20.

1996 Chrysler Cirrus Owners Manual, Understanding Your Instrument Panel, Copyright 1995 Chrysler Corporation, p. 82.

*Primary Examiner*—Harry B. Tanner
*Attorney, Agent, or Firm*—Webb Ziesenheim Bruening Logsdon Orkin & Hanson, P.C.

[57] ABSTRACT

An energy efficient HVAC system for motorized vehicles includes an HVAC selector switch for activating and deactivating one or more of the group consisting of an air conditioning mode, a venting mode, a heating mode, a bi-level mode and a defrosting mode; a temperature control switch for regulating an amount of hot or cold air produced by the HVAC system including an air conditioning compressor a device for activating the air conditioning compressor during the air conditioning mode, and a device for intermittently activating the air conditioning compressor during the defrosting mode.

7 Claims, 3 Drawing Sheets

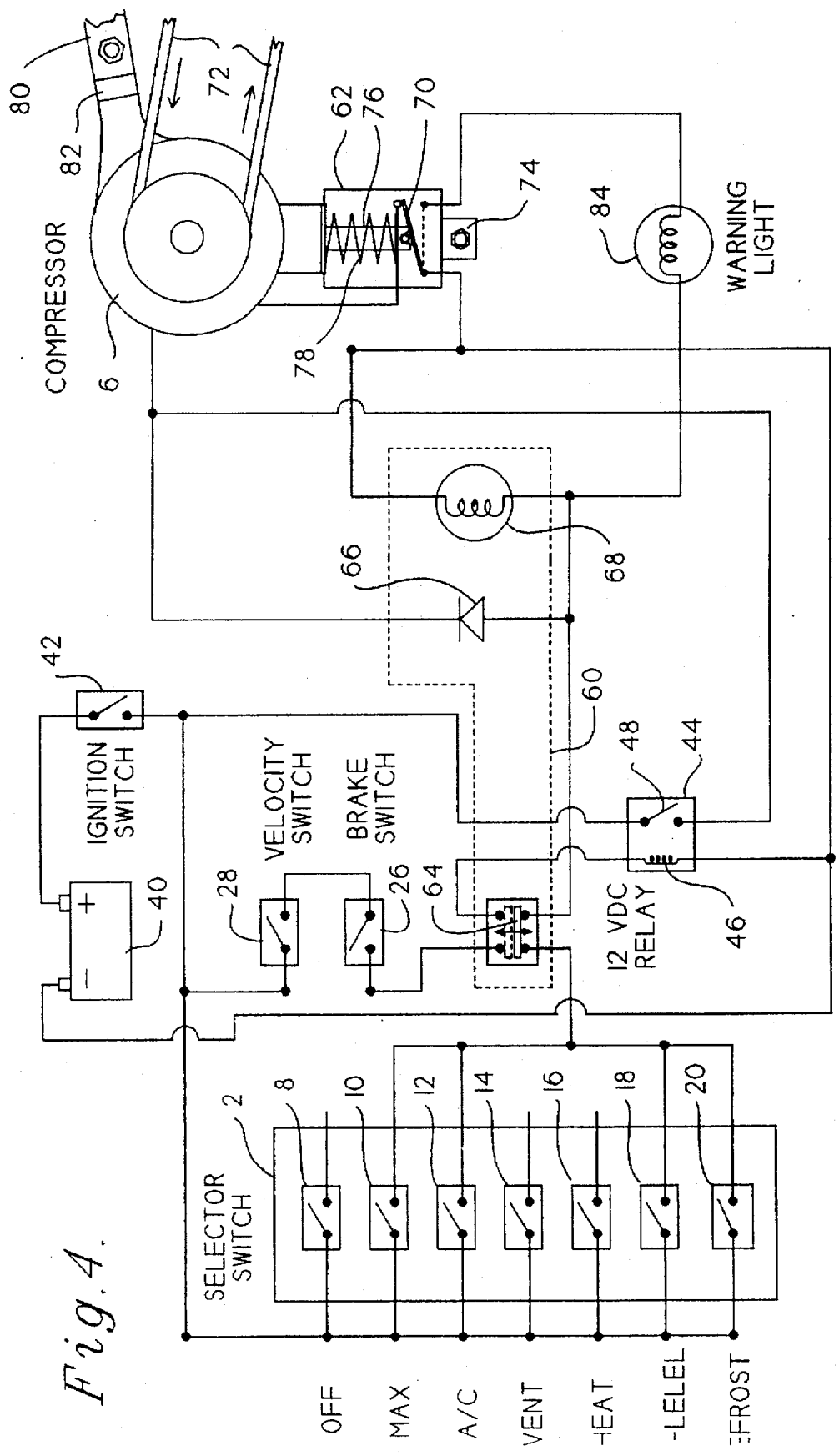

ENERGY SAVING HVAC CONTROL SYSTEM

BACKGROUND OF THE INVENTION

Field of the Invention

The present invention relates to an improved heating, ventilation, air conditioning control system for use with a motorized vehicle. More specifically, the present invention relates to an improved heating, ventilation, air conditioning control system for motorized vehicles which employ an air conditioning compressor.

Motorized vehicles, such as automobiles, trucks and the like, utilize air conditioning systems to cool the passenger compartment thereof. Such systems employ an air conditioning compressor to compress a gas, typically Freon, to its liquid state, which liquid exhibits substantial cooling upon expansion back to its gaseous phase. This cooling is used to cool the passenger compartment of the motorized vehicle.

Such air conditioning compressors typically require substantial amounts of the available engine horsepower of the motorized vehicle when running in a compressing mode. The result is a substantial decrease in fuel efficiency, typically measured in the loss of miles traveled per gallon of fuel consumed.

On most motorized vehicles, a control unit located within the passenger compartment is responsible for activating and deactivating the air conditioning compressor during an air conditioning mode. Some control units also permits the selection of the intensity at which the HVAC system operates, as for example the choice between normal and maximum air conditioning.

The typical control unit is comprised of an HVAC selector switch and a temperature control switch. The HVAC selector switch permits the selection of the activation and deactivation of the air conditioning mode, and permits the selection of other HVAC modes or options as well. Such modes include, without limitation: a venting mode providing for the opening and closing of one or more vents for allowing unconditioned exterior air to enter the passenger compartment; a heating mode providing for the activating and deactivating of a heater for warming the passenger compartment of the motorized vehicle; a bi-level mode providing for the apportioning of the flow of air produced by one or more fans to the upper portion of the passenger compartment, the lower portion of the passenger compartment or both; and finally, a defrosting mode providing for the activating and deactivating of a defroster cycle in which the air generated by one or more fans is directed to the windshield of the motorized vehicle to remove frost, ice, snow and the like. The air conditioning compressors described above are not designed for long periods of suspended operation, such as might occur during colder winter months. To this end, it is important that the compressor operate periodically, even during periods of cold weather to ensure that all internal operating parts remain adequately lubricated. Because it is unlikely that the air conditioner compressor will be intentionally activated by most vehicle operators during the cooler winter months, most control units, and more specifically most HVAC selector switches are designed to activate the air conditioning compressor not only in the air conditioning mode, but also when the defrost mode is selected. In this manner, the air conditioning compressor will be activated: 1) during the warm summer months directly by selecting the air conditioning mode with the HVAC selector switch to cool the passenger compartment of the motor vehicle; and 2) during the winter months when the defroster mode is activated.

The occasional or intermittent operation of the compressor is desirable during winter months to keep the air conditioning compressor lubricated and in proper operating condition. The selection of defroster mode, however, causes the air conditioning compressor to run continuously which results in a constant load on the engine and a corresponding wasting of fuel efficiency.

It is the object of the present invention to overcome the above problems and others by providing a new and improved apparatus for causing an air conditioning compressor of a motorized vehicle to be intermittently operated so as to avoid a constant load on the engine and provide for increased fuel efficiency.

SUMMARY OF THE INVENTION

In accordance with one facet of the invention, an energy efficient HVAC system for a motorized vehicle is provided. The HVAC system includes an HVAC selector switch for selectively activating one of an air conditioning mode, a vent mode, a heat mode, a bi-level mode and a defrost mode. A temperature control switch is provided for regulating an amount of hot or cold air produced by said HVAC system. A means is provided for activating the compressor when said air conditioning mode is selected and a means is provided for intermittently activating said air conditioning compressor during said defrosting mode.

In accordance with another aspect of the invention, the temperature control switch further includes a cool mode for activating the compressor only when the intermittent activation means is activated and a cold mode for activating the compressor when the HVAC selector switch is in said defrosting mode regardless of whether the intermittent activation means is activated.

In accordance with yet another aspect of the invention, the intermittent activation means includes a switch operatively disposed for causing said air conditioning compressor to activate when a brake pedal in said vehicle is depressed and to deactivate when said brake pedal is released.

In accordance with still yet another aspect of the invention, the intermittent activation means includes a velocity switch for causing said air conditioning compressor to activate when the brake pedal is depressed at vehicle speeds in excess of a first desired velocity and for causing said air conditioning compressor to deactivate at vehicle speeds below a second desired velocity.

In accordance with a more limited aspect of the invention, the first velocity and the second velocity are the same.

In accordance with a yet a more limited aspect of the invention, the first desired velocity is 20 miles per hour.

In accordance with another facet of the invention, an energy efficient HVAC system for a motorized vehicle is provided. The HVAC system includes: an HVAC selector switch for selectively activating one of an air conditioning mode, a venting mode, a heating mode, a bi-level mode and a defrosting mode; an air conditioning compressor; a means for activating said air conditioning compressor during said air conditioning mode; and a means for automatically activating said air conditioning compressor for a predetermined interval of time upon starting said motorized vehicle when said HVAC selector switch is in one of venting mode, heating mode, bi-level mode and defrosting mode.

In accordance with another aspect of the invention, the automatic activation means activates said air conditioning compressor only when said HVAC selector switch is in said defrosting mode.

In accordance with a more limited aspect of the invention, said interval of time is approximately 5 seconds.

In accordance with yet another aspect of the invention, said automatic activation means further includes a switch connected to said air conditioning compressor and a fasten seat belt indicator that is activated for predetermined period after the vehicle is started. The activation of said fasten seat belt indicator causing said switch to activate said air conditioning compressor while said fasten seat belt indicator is activated, and wherein said air conditioning compressor is deactivated when said fasten seat belt indicator is deactivated.

In accordance with yet another facet of the invention, an HVAC system for use on a motorized vehicle is provided. The system includes an air conditioning compressor; and a means for selecting one of a first and second circuit path between a source of power and said air conditioning compressor. The first circuit path includes a HVAC selector switch having a position for causing said compressor to be continuously activated and the second circuit path includes a means for intermittently activating said compressor.

In accordance with another aspect of the invention, the intermittent activation means includes a brake switch operatively disposed relative to a brake pedal for activation thereby, wherein the activation of said brake pedal causes said compressor to be activated. A velocity switch is provided for activation as a function of the speed of the vehicle, wherein the activation of the velocity switch coincident with the activation of said brake switch causes said compressor to be activated.

In accordance with still yet another facet of the invention, a torque switch is provided for isolating said compressor from said source of electrical power in response to rotational resistance of said compressor being above a desired amount. A warning light is provided for activation when said compressor is isolated from said source of electrical power.

An advantage of the present invention is that it provides for the intermittent operation of the air conditioning compressor to avoid a constant load on the engine and to provide for increased fuel efficiency.

Another advantage of the present invention is that it provides for automatic intermittent operation of the air conditioning compressor to avoid extended periods of non-use.

Still another advantage of the present invention is that is provides for isolation of the compressor from a source of electrical energy when the rotation resistance of the compressor is in excess of a desired amount.

Still other advantages will become apparent upon reading and understanding the following detailed description.

BRIEF DESCRIPTION OF THE DRAWINGS

FIG. 4 is an diagrammatic illustration of an alternate embodiment the HVAC system of the present invention illustrating a first electrical path that provides for the continuous operation of the air conditioning compressor and a second electrical path that provides for the intermittent operation of the air conditioning compressor.

DETAILED DESCRIPTION OF THE PREFERRED EMBODIMENTS

Figure 1:
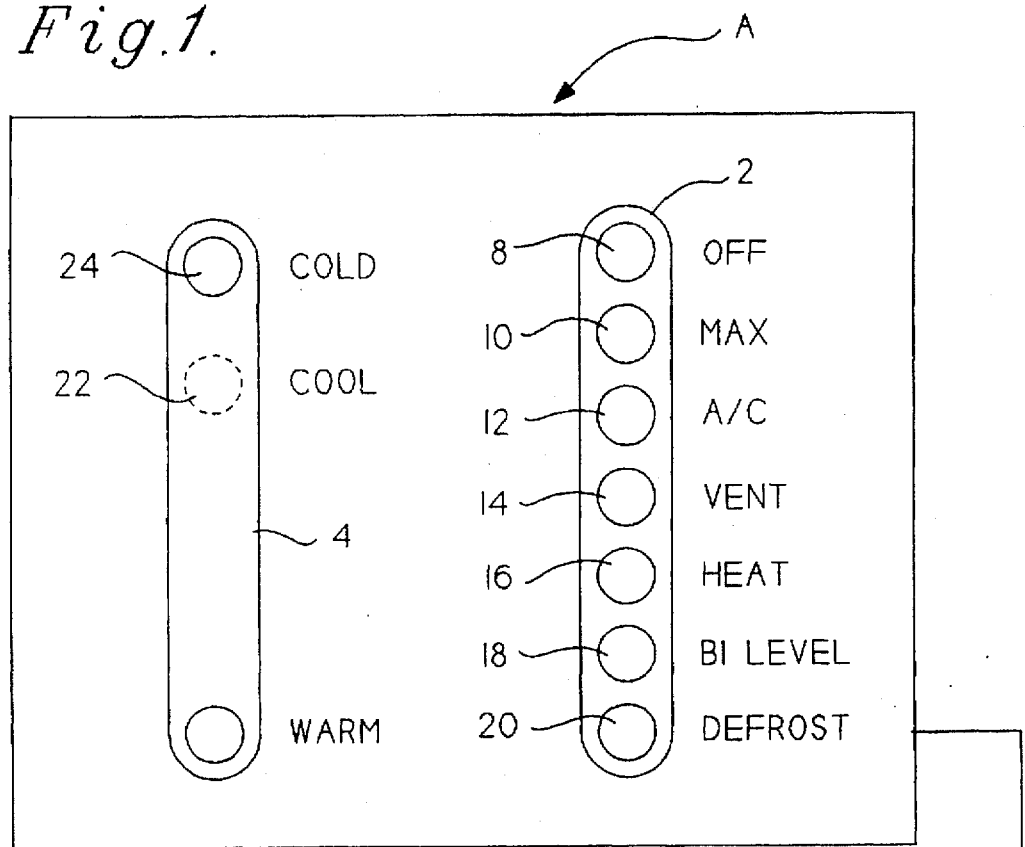
FIG. 1 is a diagrammatic illustration of the HVAC system of the present invention.
Figure 1:
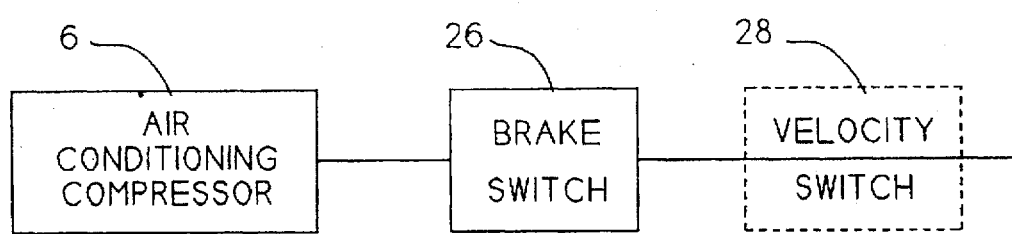

With reference to FIG. 1, an HVAC control unit A is illustrated as having a HVAC selector switch 2 and a temperature control switch 4. The control unit is typically located in a passenger compartment of a motorized vehicle for controlling the operation of a vehicle HVAC system that includes an air conditioning system having an air conditioning compressor 6. Such vehicles typically include a vent system and a variable speed fan, not shown. The vent system provides for selectively directing ambient air from outside the vehicle or air from inside the passenger compartment to, without limitation, floor vents, dash vents, windshield vents, or combinations thereof. The variable speed fan is provided for urging air through the vent system. The speed of the fan is typically varied by a multi-position fan switch, not shown, conveniently disposed in the vehicle for operator adjustment thereof.

The temperature control switch 4 has two extreme positions, cool and warm, and a continuously variable range therebetween for selection of a desired temperature to be output to the passenger compartment by the vehicle HVAC system. The temperature control switch is typically connected to a continuously variable water valve for controlling the operation thereof. The water valve controls the flow of warm water from the vehicle's engine system into a heating core disposed in the passenger compartment of the motorized vehicle. Specifically, moving the temperature control switch to warm causes the water valve to open and permit warm heating water to enter the heating core. Similarly, moving the temperature control switch to cool causes the water valve to close and restrict the flow of water from the vehicle's engine to the heating core. The fan is disposed to force air over the heater core and into the vent system for discharge into the passenger compartment. In this manner, the amount of heat introduced into the passenger compartment is selectively controlled.

Selector switch 2 is illustrated as a sliding bar type switch. It is to be appreciated, however, that such selector switch could alternatively be a rotating switch, individual push-buttons and the like, that provide for selection of one of a plurality of HVAC operating modes such as, without limitation, OFF, MAX, A/C, VENT, HEAT, BI-LEV and DEFROST.

With the HVAC selector switch in the 'OFF' position 8, no heating or cooling of the passenger compartment of the vehicle is provided. In this respect, the vent system and fan are modified so that little or no air flows through the vent system and into the passenger compartment.

When the HVAC selector switch is in 'MAX' position 10, the air conditioning compressor 18 is activated and the vent system and fan are typically modified to provide a maximum amount of cooling for the passenger compartment. Specifically, by way of example and not of limitation, the vent system is modified to recycle air inside the passenger compartment to the dash vents and the fan is set to its maximum speed regardless of the position of the multi-position fan switch.

When the HVAC selector switch 2 is in 'A/C' position 12, the air conditioning compressor 6 is activated and the vent system and fan are modified to provide a somewhat lower degree of cooling than is provided with the selector switch in 'MAX' position 10. For example, the vent system is modified to direct ambient air to the dash vents and the speed of the fan is established by the position of the multi-position fan switch.

When the HVAC selector switch 2 is in 'VENT' position 14, the air conditioning compressor 6 is not activated and the vent system is modified to provide a path for ambient air to be directed, typically, to the dash vents. The speed of the fan is established by the position of the multi-position fan switch.

When the HVAC selector switch 2 is in 'HEAT' position 16, the air conditioning compressor 6 is not activated and the vent system is modified to provide a path for ambient air to be directed, typically, to the floor vents and selected dash vents and the speed of the fan is established by the position of the multi-position fan switch.

When the HVAC selector switch 2 is in 'BI-LEV' position 18, the air conditioning compressor 6 is activated and the vent system is modified to provide a path for air to be directed to, for example, the floor vents and the windshield vents and the speed of the fan is established by the position of the multi-position fan switch.

In the present invention, when the HVAC selector switch 2 in the 'DEFROST' position 20, the air conditioning compressor 6 is not immediately activated and the vent system is modified to provide a path for air to be directed to the windshield vents and, optionally, selected dash vents. Importantly, the operation of the present invention is in contrast to the prior art wherein the selector switch in the 'DEFROST' position causes the compressor 6 to be activated.

In the present invention, a brake switch 26 is operatively disposed for activation when a brake pedal, not shown, in the vehicle is activated. The brake switch 26 is electrically connected between the compressor 26 and the 'DEFROST' position of the HVAC control system. In operation, activating brake switch 26 with the HVAC selector switch 2 in the "DEFROST' position activates the air conditioning compressor 6. Similarly, deactivating the brake switch 26 with the HVAC selector switch 2 in the 'DEFROST' position deactivates the compressor. In this manner, the compressor 6 is intermittently activated at times when there is reduced demand for the engine to propel the vehicle, such as when the vehicle is braking. The operation of the present invention is in contrast to the prior art wherein the compressor 6 is activated when the selector switch 2 is in 'DEFROST' position.

To provide for activation of the compressor 6 when desired, the 'MAX', 'A/C' or 'BI-LEV' positions of the selector switch are directly connected to the compressor 6. In this manner, the brake switch is electrically by-passed when these modes are selected.

The intermittent activation of the compressor in 'DEFROST' mode has been described in conjunction with the activation of brake switch 26. It is to be appreciated, however, that compressor 6 is also activatable by a brake switch (not shown) that is utilized to activate the vehicles brake light system. Because of the substantial electrical energy demands of the compressor 6, it may be desirable to include a relay switch in the system to activate compressor 18 with the signal provided by brake switch 26.

The HVAC system of the present invention benefits by having the air conditioning compressor operated in the above described manner during times of cooler whether when 'DEFROST' mode is used most often. Specifically, these benefits include lubrication of the internal working parts of the air conditioning compressor and lubrication of seals and the like. Further, the disadvantages of prior art HVAC systems are overcome by having the compressor 18 activated only during periods when the motorized vehicle is braking. During such periods, there is no reduction in fuel efficiency associated with prior art HVAC systems, because the drain on the engine's horsepower provided by the operation of the air conditioning compressor occurs only during braking.

In accordance with an alternate embodiment of the invention, the temperature control switch 4 includes a 'COLD' position 24. When the temperature control switch 4 is in the 'COLD' position and the HVAC selector switch 2 is in the 'DEFROST' position, the compressor 6 is activated. In this manner, the compressor can be operated independent of the activation of the brake switch.

In accordance with yet another alternate embodiment, a velocity switch 28, shown in phantom in FIG. 1, is electrically connected between the compressor 6 and the 'DEFROST' position of the HVAC control system and in series with the brake switch 26. The velocity switch 28 is disposed on the vehicle for sensing air flow relative to the vehicle and is calibrated to activate when exposed to air flow of sufficient extent, e.g., air flow at or above 20 miles per hour. In operation, activating the brake switch with the HVAC selector switch 2 in the 'DEFROST' position and the velocity switch being activated activates the compressor. If not exposed to sufficient air flow, however, the velocity switch is not activated and therefore the compressor will not be activated by activation of the brake switch. In this manner, the compressor is not activated during lengthy periods of braking, such as traffic jams and the like, when the HVAC selector switch is in the 'DEFROST' position and temperature control switch is not in the 'COLD' position. It is to be appreciated that, generally, velocity switches activated by a flow of air often have a hysteresis associated therewith so that such switches activate at a first pressure and deactivate at a second lower pressure. To minimize switching at different velocities, the present invention alternatively has an electronic velocity switch connected to the speedometer or transmission for detecting vehicle velocity therefrom.

Figure 2:
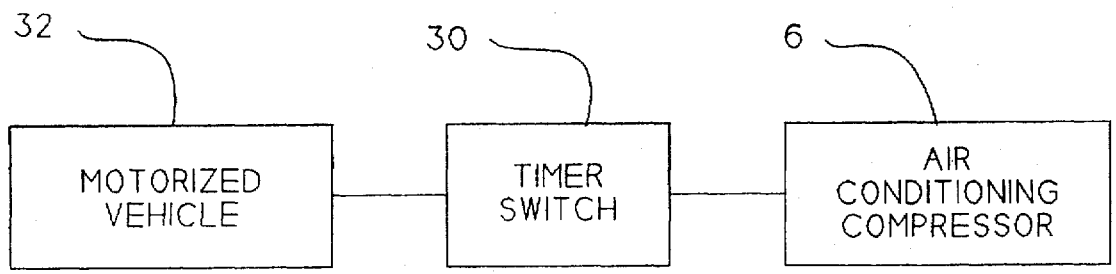
FIG. 2 is an diagrammatic illustration of an alternate embodiment the HVAC system of the present invention.

With reference to FIG. 2, in still yet another alternate embodiment of the present invention, the air conditioning compressor 6 is activated concurrent with starting of the vehicle and continues to operate for a preset period of time. Specifically, a timer switch 30 is electrically connected between the compressor 6 and the vehicle 32. The timer switch is activated when the vehicle is started and causes electrical power to supplied to the compressor for a predetermined time thereafter. The timer switch can be a dedicated timer switch for the activation of air conditioning compressor 18. Alternatively, the timer switch may comprise a signal taken from a timed circuit already incorporated in the motorized vehicle, such as the common "fasten seat belt" light incorporated into many vehicles which flashes a seat belt reminder for a preset period of time after starting the vehicle.

Figure 3:
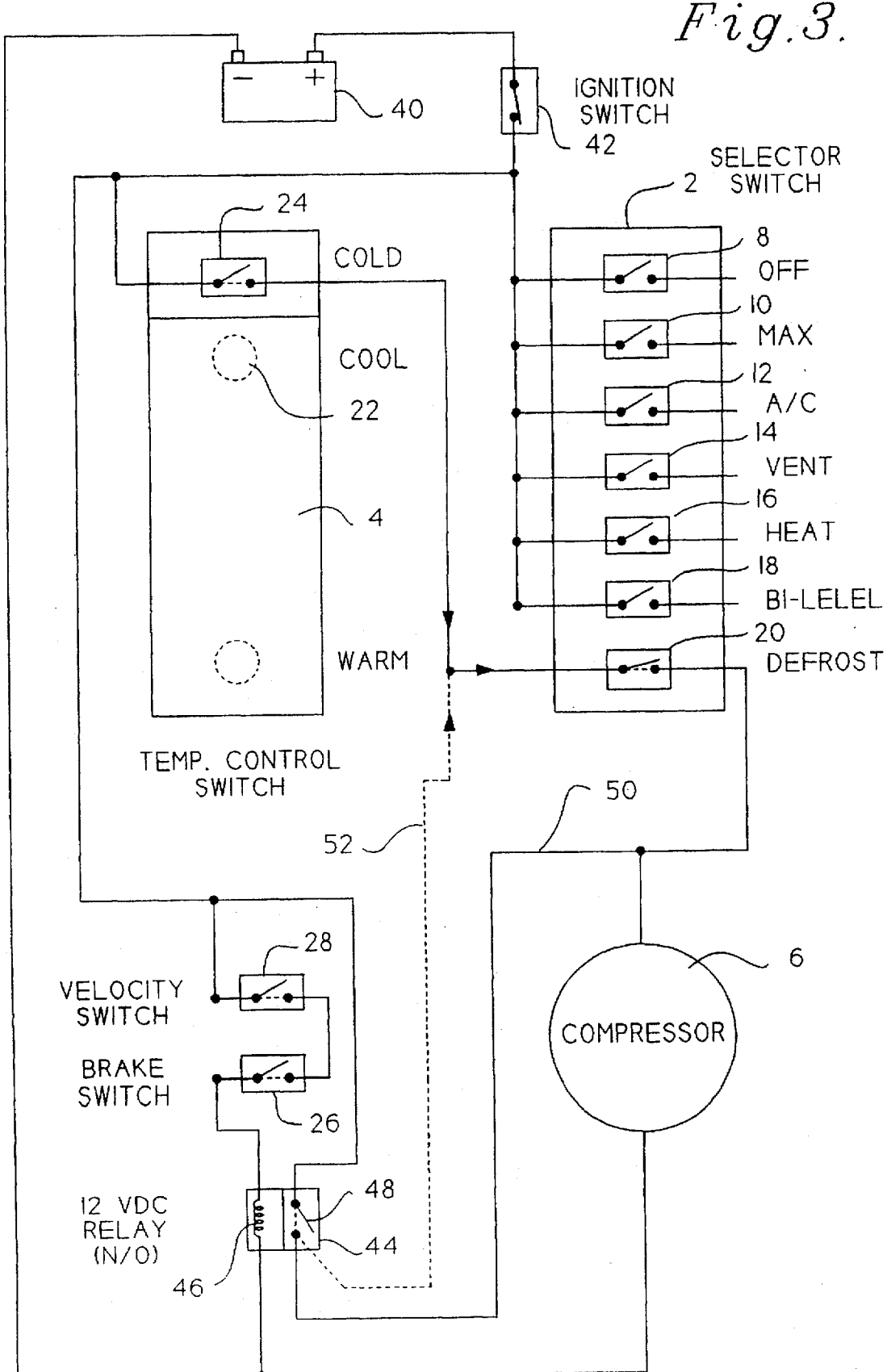
FIG. 3 is a wiring schematic of the HVAC system of the present invention illustrating a first electrical path that provides for the continuous operation of the air conditioning compressor and a second electrical path that provides for the intermittent operation of the air conditioning compressor.

With reference to FIG. 3 and continuing reference to all previous Figs., a wiring schematic of the HVAC system of the present invention illustrating electrical connection of the 'DEFROST' position 20 of selector switch 2 and the 'COLD' position 24 of temperature control switch 4 to compressor 6 are illustrated. Because the electrical connections of the selector switch 2 for 'OFF', 'MAX', 'A/C', 'VENT', 'HEAT' and 'BI-LEV' are known from the prior art, the electrical connection thereof have been omitted to simplify FIG. 4. In the figure, compressor 6 is switchably connected to battery 40 through a pair of parallel electrical paths. Specifically, a first electrical path is provided between the battery and the compressor through ignition switch 42, the 'COLD' position 24 of temperature control switch 4 and the 'DEFROST' position 20 of selector switch 2. In operation, when the temperature control switch 4 is in the 'COLD' position 24, the selector switch 2 is in the 'DEFROST' position 20 and the ignition switch 42 is activated, the first electrical path is completed for providing electrical power from the battery 40 to the compressor. In this manner, compressor 6 is activated continuously during operation of the vehicle in a conventional manner. Alternatively, a second electrical path for providing power from the battery to the compressor is provided. The second electrical path is comprised of ignition switch 42, brake switch 26, velocity switch 28 and relay 44. Specifically, coil 46 of relay 44 is electrically connected to battery 40 through brake switch 26, velocity switch 28 and ignition switch 42. Relay 44 includes contact 48 that is activated in response to the energization of coil 46. In operation, activating brake switch 26 and velocity switch 28 with the ignition switch 42 activated causes coil 46 to be energized. Energizing coil 46 causes contacts 48 to be activated and provide an electrical path between the battery 40 and compressor 6 via line 50. In this manner, electrical power is provided from the battery to the compressor when the brake switch 26 and the velocity switch 28 are activated. The second electrical path described above provides for the compressor to be activated regardless of the position of the temperature control switch or the selector switch. Alternatively, line 50 is replaced by line 52, shown in phantom, connecting relay 44 to the 'DEFROST' position of selector switch 20. In this alternate embodiment, electrical power is provided from the battery to the compressor when the brake switch 26 and velocity switch are activated in the presence of selector switch 20 being in 'DEFROST' position 20. In yet another alternate embodiment, velocity switch 28 is omitted from the second electrical path so that the activation of compressor 6 is made independent of the velocity of the vehicle.

With reference to FIG. 4 and continuing reference to all previous Figs., compressor 6 is electrically connectable to battery 40 through one of two parallel paths. Specifically, a first electrical path is comprised of ignition switch 42, selector switch 2, illuminated A/C switch 60 and torque switch 62. More specifically, the 'MAX', 'A/C', 'BI-LEV' and 'DEFROST' positions of the selector switch 2 provide electrical paths between the battery and the illuminated A/C switch 60. The illuminated A/C switch 60 includes an operator selectable dual position switch 64, a diode 66 and a lamp 68 or other such illuminating means. The dual position switch 64 is disposed in the lower position in FIG. 5 for switchably selecting the first electrical path. The torque switch 62 includes a manually setable single pole double throw switch 70 disposed in the upper position in FIG. 5 for completing the first path. In operation, when the ignition switch 42 activated, the selector switch in one of the 'MAX', 'A/C', 'BI-LEV' and 'DEFROST' positions, and the illuminated A/C switch in the lower position, the positive terminal of the battery 40 is electrically connected to the compressor 6 through diode 66. A return path to the negative terminal of battery 40 from the compressor is provided through upwardly disposed switch 70 of torque switch 62. Moreover, when the positive terminal of the battery is connected to the compressor in the manner set forth above, the lamp 68 is electrically connected for energization by the battery.

Alternatively, a second electrical path is comprised of ignition switch 42, velocity switch 28, brake switch 26, torque switch 62, relay 44 and illuminated A/C switch 60 having dual position switch 64 in the upper position, shown in phantom, in FIG. 5. In operation, when the ignition switch 42, velocity switch 28 and brake switch 26 are activated and the dual position switch 64 in the upper position, the positive terminal of the battery provides energizing current to coil 46 of relay 44. Energizing coil 46 activates contact 48 to form an electrical path between the positive terminal of the battery and the compressor. Like the first path, a return path between the compressor and the negative terminal of battery 40 is provided through switch 70 of torque switch 62. Alternatively, the velocity switch 28 could be omitted from second electrical path and the intermittent operation of the compressor be caused by the activation of the brake switch.

From the foregoing, it should be appreciated that the position of switch 64 provides for selecting whether the compressor is operated continuously or intermittently. Specifically, when switch 64 is in the lower position, i.e., the first electrical path, and the selector switch is in one of the 'MAX', 'A/C', 'BI-LEV' and 'DEFROST' position, the compressor is operated continuously and lamp 68 is illuminated. In contrast, when the switch 64 is in the upper position, i.e., the second electrical path, the compressor is intermittently operated as a function of the activation of the velocity switch 28 and the brake switch 26, and lamp 68 is not illuminated.

With continuing reference to FIG. 4, it is desirable to de-activate the compressor when it becomes inoperative or damaged and to have it remain de-activated until serviced by a qualified technician. To this end, a characteristic of an inoperative or damaged compressor is an increase in rotational friction over a normally operating compressor when driven by an engine belt 72. This increased rotational friction causes increased load on the engine and may exasperate damage to the compressor. To avoid activating the compressor when inoperative or damaged, torque switch 62 is provided for de-activating the compressor. Specifically, the torque switch is disposed in conjunction with a first mounting leg 74 provided for supporting the compressor relative to the engine. The torque switch includes switch 70, and plunger 76 upwardly biased, in FIG. 4, by spring 78. A second mounting leg 80, including a resilient isolator 82, made of, for example, rubber, is provided for further supporting the compressor relative to the engine while providing for limited movement of the compressor relative to the engine. With reference to FIG. 4, activating the compressor causes belt 72 to drive compressor 6 in a counter-clockwise (CCW) direction which in-turn produces a CCW force acting to compress spring 78. The spring tension of spring 78 is selected to maintain plunger 76 biased away from upwardly disposed switch 70 when the compressor is operating normally. In contrast, when the compressor is damaged or inoperative, the CCW force acting thereon is of sufficient extent to compresses spring 78 and cause plunger 76 to engage switch 70 with sufficient force to move switch 70 from the upwardly disposed position to a downwardly disposed position, shown in phantom in FIG. 4. With switch 70 disposed downwardly, the compressor is isolated from the negative terminal of battery 40 and a warning light 84 is connected between the terminals of the battery through the first path set forth above. In this manner, the compressor is prevented from being activated when the rotational friction thereof increases above a desired amount and a visual indication thereof is provided. By preventing the operation of the compressor when damaged or inoperative, the torque switch also prevents excessive wear or damage to the belt 72 while maintaining the vehicle operable. In the preferred embodiment, once downwardly disposed, manual intervention is required to reset switch 70 upwardly to reconnect the negative terminal of the battery to the compressor and to disconnect the warning light therefrom.

The above invention has been described with reference to the preferred embodiments. Obvious modifications and alterations will occur to others upon reading the preceding detailed description. It is intended that the invention be construed as including all such modifications and alterations insofar as they come within the scope of the appended claims or the equivalents thereof.

What is claimed is:

1. An energy efficient HVAC system for a motorized vehicle including:
   an HVAC selector switch for selectively activating one of an air conditioning mode, a vent mode, a heat mode, a bi-level mode and a defrost mode;
   a temperature control switch for regulating an amount of hot or cold air produced by said HVAC system;
   an air conditioning compressor;
   a means for activating said air conditioning compressor during said air conditioning mode; and
   a means for intermittently activating said air conditioning compressor during said defrosting mode.

2. The HVAC system of claim 1 wherein said temperature control switch further comprises:
   a cool mode, wherein said air conditioning compressor is activated only when said means for intermittently activating said air conditioning compressor is activated; and
   a cold mode, wherein said air conditioning compressor is activated when said HVAC selector switch is in said defrosting mode regardless of whether said means for intermittently activating said air conditioning compressor is activated.

3. The HVAC system of claim 1 wherein said means for intermittently activating said air conditioning compressor during said defrosting mode includes a switch operatively disposed for causing said air conditioning compressor to activate when a brake pedal in said vehicle is depressed, said switch causing said air conditioning compressor to deactivate when said brake pedal is released.

4. The HVAC system of claim 3 wherein said means for intermittently activating said air conditioning compressor during said defrosting mode further includes a velocity switch for causing said air conditioning compressor to activate when the brake pedal is depressed at vehicle speeds in excess of a first desired velocity, said velocity switch causing said air conditioning compressor to deactivate at vehicle speeds below a second desired velocity.

5. The HVAC system of claim 4 wherein said first velocity and said second velocity are the same.

6. The velocity switch of claim 4 wherein said first desired velocity is 20 miles per hour.

7. An energy efficient HVAC system for a motorized vehicle including:
   an HVAC selector switch for selectively activating one of an air conditioning mode, a vent mode, a heat mode, a bi-level mode and a defrost mode;
   a temperature control switch for regulating an amount of hot or cold air produced by said HVAC system;
   an air conditioning compressor;
   a means for activating said air conditioning compressor during said air conditioning mode, and
   at least two of:
   (i) a first means for intermittently activating said air conditioning compressor during said defrost mode;
   (ii) a means for selecting one of a first and second circuit path between a source of power and said air conditioning compressor, wherein said first circuit path includes the HVAC selector switch having a position for causing said compressor to be continuously activated, and wherein said second circuit path includes a second means for intermittently activating said compressor in one of said vent mode, heat mode, bi-level mode and defrost mode;
   (iii) a means for automatically activating said air conditioning compressor for a predetermined interval of time upon starting said motorized vehicle when said HVAC selector switch is in one of said vent mode, heat mode, bi-level mode and defrost mode; and
   (iv) a torque switch disposed relative to said compressor for isolating the same from a source of electrical energy in response to the rotational resistance of said compressor being above a desired amount.

* * * * *